(12) United States Patent
Desmarais et al.

(10) Patent No.: US 11,200,610 B2
(45) Date of Patent: ***Dec. 14, 2021

(54) METHODS AND SYSTEMS FOR MEASURING ARTICLES OF APPAREL

(71) Applicant: TAILORED IP, LLC, Naples, FL (US)

(72) Inventors: Dave J. Desmarais, Naples, FL (US); Kristy L. Desmarais, Naples, FL (US)

(73) Assignee: TAILORED IP, LLC, Naples, FL (US)

( * ) Notice: Subject to any disclaimer, the term of this patent is extended or adjusted under 35 U.S.C. 154(b) by 182 days.

This patent is subject to a terminal disclaimer.

(21) Appl. No.: 16/415,811

(22) Filed: May 17, 2019

(65) Prior Publication Data

US 2019/0272575 A1 Sep. 5, 2019

Related U.S. Application Data

(63) Continuation of application No. 14/887,661, filed on Oct. 20, 2015.

(60) Provisional application No. 62/067,667, filed on Oct. 23, 2014.

(51) Int. Cl.
| | |
|---|---|
| *G06Q 30/06* | (2012.01) |
| *H04N 7/18* | (2006.01) |
| *A41H 1/00* | (2006.01) |
| *A41H 3/00* | (2006.01) |
| *G06T 7/62* | (2017.01) |

(52) U.S. Cl.
CPC ........... *G06Q 30/0623* (2013.01); *A41H 1/00* (2013.01); *A41H 3/007* (2013.01); *G06T 7/62* (2017.01); *H04N 7/185* (2013.01)

(58) Field of Classification Search
None
See application file for complete search history.

(56) References Cited

U.S. PATENT DOCUMENTS

| | | |
|---|---|---|
| 5,530,652 A | 6/1996 | Croyle et al. |
| 6,728,417 B1 | 4/2004 | Hara et al. |
| 7,594,189 B1 | 9/2009 | Walker |
| 2007/0100702 A1 | 5/2007 | Morley |
| 2010/0023421 A1 | 1/2010 | Wannier |
| 2011/0022965 A1 | 1/2011 | Lawrence |
| 2012/0316985 A1 | 12/2012 | Wilkinson |

(Continued)

FOREIGN PATENT DOCUMENTS

WO 2014034188 3/2014

*Primary Examiner* — Jiangeng Sun
(74) *Attorney, Agent, or Firm* — Hahn Loeser & Parks LLP

(57) ABSTRACT

A method herein is directed toward measuring clothing through image processing. The method comprises capturing a digital image of a clothing article and a reference object with the camera of the portable electronic device, analyzing the reference object in the digital image to determine a scale of the digital image with the processor of the portable electronic device, analyzing the clothing article in the digital image to determine a determined value for each of a plurality of measurements of the clothing article with the processor of the portable electronic device based upon the determined scale of the digital image, and transmitting the determined value for each of the plurality of measurements with the wireless communication transceiver of the portable electronic device, whereby the clothing article is measured with the portable electronic device.

18 Claims, 8 Drawing Sheets

(56) References Cited

U.S. PATENT DOCUMENTS

2013/0179288 A1    7/2013   Moses
2014/0270540 A1    9/2014   Spector

METHODS AND SYSTEMS FOR MEASURING ARTICLES OF APPAREL

CROSS-REFERENCE TO RELATED APPLICATIONS

This application claims the benefit of U.S. Provisional Patent Application No. 62/067,667, filed Oct. 23, 2014, which is herein incorporated by reference in its entirety.

BACKGROUND OF THE INVENTION

Field of the Invention

This application relates generally to accurately measuring clothing items and, more specifically, to recommending clothing substantially similar to clothing items for which measurements are calculated.

Description of Related Art

Consumers are faced with a nearly inconceivable number of options as to clothing purchases. In addition to those available in stores, electronic commerce has extended the reach of manufacturers and retailers and allowed the buying public to find brands and styles not available in local stores.

However, a typical clothing buyer is only interested in specific types of clothes. Locating appropriate clothes for purchase can therefore be more difficult as purchasers must sort through a multitude of products to find styles and brands that suit their tastes.

Given the voluminous options and increasingly e-commerce based nature of purchasing, one of the most difficult aspects of clothing purchasing is finding an appropriate fit. Different manufacturers deviate dramatically in size. A "medium" from one manufacturer may be a "small" or "large" from another. Further, even where manufacturers provide absolute measurements, such are not always true. Even assuming the measurement is accurate, the major measurements provided—such as waist and inseam for trousers, or neck and sleeve length for men's shirts—do not always properly capture the fit of an item. While some information is provided by honest sizing, the qualitative fit (e.g., slim versus relaxed) is difficult to discern from these generalized measurements.

BRIEF SUMMARY OF THE INVENTION

A simplified summary is provided herein to help enable a basic or general understanding of various aspects of example, non-limiting embodiments that follow in the more detailed description and the accompanying drawings. This summary is not intended, however, as an extensive or exhaustive overview. Instead, the sole purpose of the summary is to present some concepts related to some example non-limiting embodiments in a simplified form as a prelude to the more detailed description of the various embodiments that follow.

In various, non-limiting embodiments, a method provides capturing a digital image of a clothing article and a reference object with the camera of the portable electronic device, analyzing the reference object in the digital image to determine a scale of the digital image with the processor of the portable electronic device, analyzing the clothing article in the digital image to determine a determined value for each of a plurality of measurements of the clothing article with the processor of the portable electronic device based upon the determined scale of the digital image, and transmitting the determined value for each of the plurality of measurements with the wireless communication transceiver of the portable electronic device, whereby the clothing article is measured with the portable electronic device.

In still further embodiments, a portable electronic device configured to measure a clothing article includes a housing, a processor, a memory, a display and a camera associated with the housing, an application resident in the memory. The application is configured to be executed by the processor to cause the processor to capture a digital image of a clothing article and a reference object with the camera of the portable electronic device, analyze the reference object in the digital image to determine a scale of the digital image with the processor of the portable electronic device, analyze the clothing article in the digital image to determine a determined value for each of a plurality of measurements of the clothing article with the processor of the portable electronic device based upon the determined scale of the digital image, and transmit the determined value for each of the plurality of measurements with the wireless communication transceiver of the portable electronic device, whereby the clothing article is measured with the portable electronic device.

In additional embodiments, a system configured to recommend clothing products is provided. The system includes a server having a processor and a memory, wherein the server is configured to receive clothing article measurements of a clothing article from a portable electronic device and an application resident in the memory of the server and configured to be executed by the processor to cause the processor to access a clothing product database, wherein the clothing product database includes defined measurement values for each of a plurality of clothing products, identify a recommended clothing product based upon a comparison of the determined values and the defined measurement values for each of a plurality of clothing products, and receive an indication of the identified recommended clothing product on the portable electronic device to be displayed to a user. In various embodiments, a clothing product is recommended by the system based upon similarity to a clothing article measured by the portable electronic device based on at least one of a geometric mean difference or an arithmetic mean difference. Further, the portable electronic device has a network communication apparatus and is capable of leveraging at least an application resident in portable electronic device memory configured to capture a digital image of a clothing article and a reference object, determine an image scale based on the reference object, and calculate the clothing article measurements of the clothing article based on the image scale.

These and other embodiments are described in more detail below.

BRIEF DESCRIPTION OF THE DRAWINGS

Various non-limiting embodiments are further described with reference to the accompanying drawings in which.

DETAILED DESCRIPTION OF THE INVENTION

Figure 1:
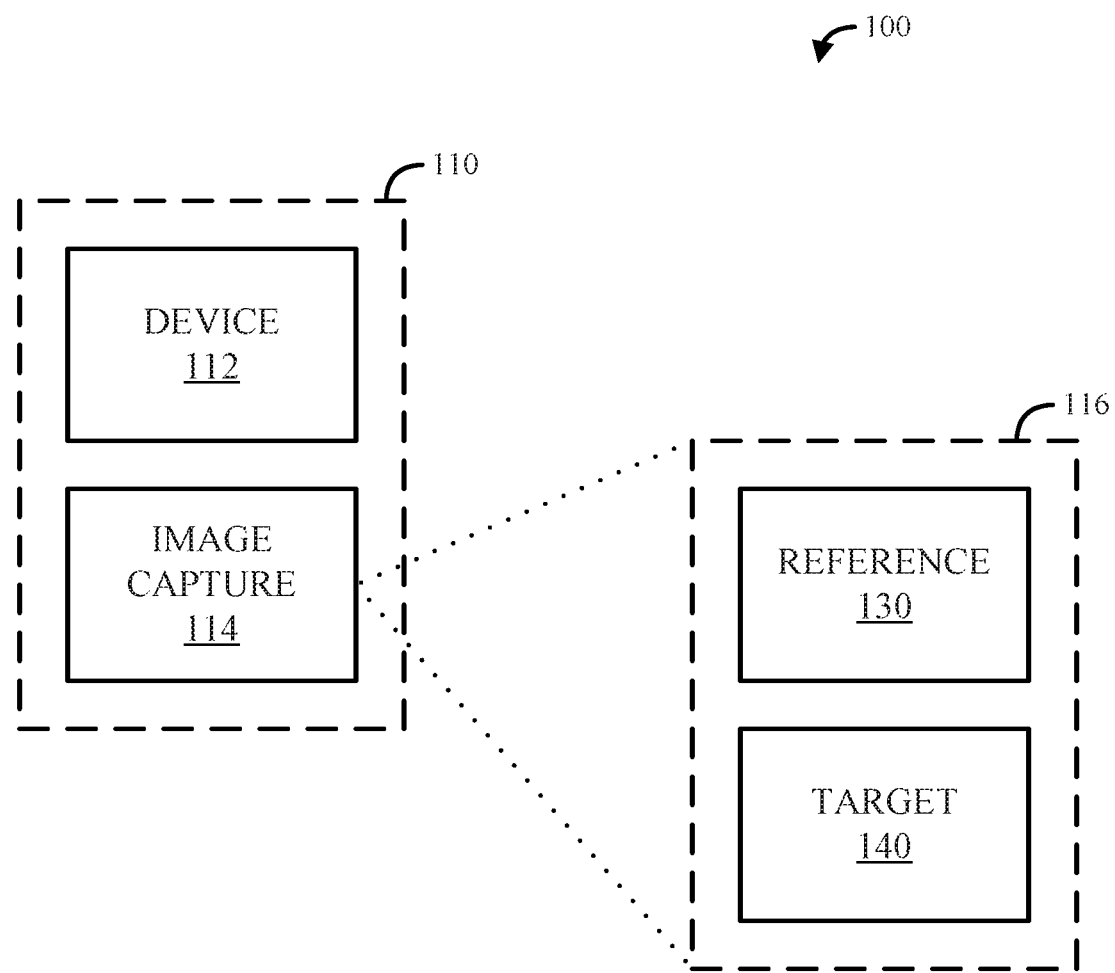
FIG. 1 illustrates a block diagram of a system for establishing measurements of a target element using an image capture apparatus.

To provide rapid and accurate measurement of clothing items, users can take pictures of clothing items for analysis. The pictures can include reference objects of known size which are analyzed, first or concurrently, to define an absolute scale for the image. With the scale established, multiple measurements are taken of the users' clothing items. Based on these measurements, items having at least a similar dimensions can be recommended to the user to assist with the user's clothing shopping.

As used herein, "hardware" is intended to refer to physical electronic components, such as communication apparatuses, transmitters, receivers, random access memory, hard drives, routers, hubs, or lower-level components such as circuit elements. Corresponding elements are discussed in greater detail with respect to FIG. 4.

A "component" or "module" herein can be any portion of hardware or software used in furtherance of corresponding aspects described. While modules are given particular names herein, it is understood that modules can be configured to perform other activity, and multiple modules can be combined into a single module or a single module separated into multiple modules without departing from the scope of the disclosure.

Components, modules, or other elements are "operatively coupled" when capable of functioning in combination, such as when they are in communication, share resources (e.g., processor time or storage), exchange information, or modify information used by one another. "Communication" herein can include any form of electric or electronic communication, via any technique or means, including wired connections or wireless techniques such as WiFi®, BlueTooth®, Zigbee®, cellular voice or data, satellite, et cetera. Direct communication through common circuits or circuit boards, such as communication between a processor and memory of the same computing device, is also captured under this terminology.

As used herein, a "clothing item", "clothing article", "clothing target", or similar terminology is used to indicate a specific piece or group of specific pieces of clothing. A "clothing type" is a category of clothing such as a shirt, pant, skirt, et cetera.

The terms "reference object", "reference element", and similar terminology are used to indicate an object of known dimensions which is analyzed to facilitate development of at least a two-dimensional coordinate system having an absolute scale.

A "measurement" herein is generally directed toward a linear measure or distance between two points, but others can be utilized in accordance with aspects described herein. A "measurement type" or "specific measurement" can include an identified measure based on the geometry of a clothing article, such as a waist, inseam, outseam, et cetera. A "measurement value," "actual measurement," or similar terminology herein are actual measured or calculated dimensions of a particular measurement type. In embodiments, the measurement value or actual measurement may differ from a "tag size," which is the size indicated by a clothing item manufacturer. "Measurement end points" or similar terminology define the points between which measurements are measured or calculated (e.g., opposing top corners of a pair of pants laid flat to define the measurement end points of a waist measurement).

Devices herein can include various electronics, but are generally used to refer to mobile devices having computing capability, such as smart phones or tablets having a housing containing memory, one or more processors, a display, a wireless communication transceiver, et cetera. A server is a network connected computing machine having at least storage or memory. An image herein is used to describe a digital image.

Turning to FIG. 1, illustrated is a system 100 for establishing measurements of a target element 140 using image capture apparatus 114. Image capture apparatus 114 is operatively coupled with device 112. Device 112 can conduct, or request conducting of, image analysis and other processing to the accomplishment of techniques described herein. Together, device 112 and image capture apparatus 114 comprise user system 110. While several mobile devices (e.g., smart phone, tablet computer) combine both capabilities, it is understood that these aspects can be functionally separated to permit a user to leverage any available image capture means or load previously captured images to user system 110 for analysis.

System 100 also includes reference element 130 and target element 140. Reference element 130 and target element 140 are within image capture field of view 116 (which can alternatively be a frame or boundaries of a preexisting image). In at least one embodiment, system 100 can exclude image capture apparatus 114 and rely exclusively on existing images of targets and reference elements (e.g., a transferred database of photos, web galleries including tokens representative of reference element 130).

As illustrated, image capture apparatus 114 is used to create and save at least one image of field of view 116 containing reference element 130 and target element 140. The at least one image is then provided to device 112 which conducts analysis on the at least one image. In embodiments there can be more than one image or video (e.g., a single frame or entire video clip) can be used for analysis. Analysis can include, but is not limited to, determining an image scale based on reference element 130.

Reference element 130 is an element of known size and shape (e.g., predefined dimensions) analyzed to define at least an absolute two-dimensional image scale for the at least one image. To provide repeatable results, reference element 130 may be a common item that resists deformation, such as a credit card, coin, popular phone model, pen, remote control, or others. However, alternative items of known geometry (e.g., 8½"×11" sheet of paper) can be provided for analysis as well. In embodiments, only a portion of reference element 130 need be visible in field of view 116 to provide sufficient data for analysis. In the earlier example, so long as two full edges of an 8½" by 11" sheet of paper are visible or identifiable, other portions of the sheet may be covered (e.g., by the target element) or cut off (e.g., partially outside frame due to angle) without compromising completion of analysis. Further, a user may define a new reference element 130 by providing its geometry including measurements, and optionally a picture of the reference element 130.

Based on the relative size and shape of known reference element 130 in the at least one image, device 112 causes determination of an image scale used in determining measurements of target element 140. To cause determination of the image scale, device 112 may utilize local storage and processing means in accordance with one or more image analysis algorithms. In alternative or complimentary embodiments, device 112 may utilize communication means to leverage remote storage and processing means in accordance with one or more image analysis algorithms to perform at least a portion of image analysis, and thereafter receive results or output from the remote means for use or display at device 112.

The image scale is applied through further image processing to target element 140 to determine at least its two-dimensional dimensions. This is accomplished by evaluating the size of the target element in field of view 116 (e.g., in pixels, inches, percentage of frame) and scaling target element 140 according to the image scale discovered through analysis of reference element 130. In this way, absolute measurements of at least height, width, and angle are determined, both in terms of total dimensions of target element 140 but also in relationship to specific sub-elements (e.g., size of or determined distance between a pair of measurement points or plurality of measurement points representing portions of clothing such as waist, leg length, sleeve length, neck, rise). With this information, true measurement information, and higher-resolution measurement information (e.g., specific dimensions and fit of jeans labeled only "34" for waist) can be produced related to target element 140.

Various intervening image processing steps can be utilized in combination with identifying a known object and establishing a scale. For example, image enhancement (e.g., cropping, automatically adjusting brightness, contrast, levels) can be utilized to produce a more recognizable image. Edge detection, blob recognition, and other machine vision techniques can be employed to recognize boundaries and internal features of one or both of reference element 130 and target element 140. By automatically recognizing a type or category of target element 140 (e.g., pant, long-sleeve shirt, dress, tank-top), various type-specific dimensions can be calculated through recognition (e.g., pre-programmed, developed through machine learning or comparison) of measurement points based on geometry and boundaries.

Further, perspective distortion, angle, and tilt can be identified and/or corrected prior to completing calculations. For example, the perspective view of reference element 130 can be utilized to determine a linear distance and/or angle from the lens to reference element 130.

In at least one embodiment, multiple two-dimensional views can be provided (e.g., different angles of the same side, opposite sides of the same article of clothing) to provide additional measurements or increase confidence in a single set of measurements.

While aspects above are described in a two-dimensional context with target elements laid flat, it is understood that multiple photos or image processing techniques can be utilized to employ three dimensional scales. For example, the use of multiple reference objects, three-dimensional reference objects, or multiple images having different fields of view or frames can be utilized to develop and identify three dimensional coordinate systems providing a third axis on which measurements can be produced. In this way, various measures of targets where three-dimensional sizing is required to properly evaluate the target (e.g., shoes, hats) can be generated.

In this regard, reference elements can include not only everyday items, but tokens or other objects specifically designed to aid in the development of coordinate systems and image scales. Such tokens can be provided in sizes and/or shapes that can be easily analyzed at varying angles. Reference tokens can also include markings, such as graduations or grids, and/or asymmetrical marks which appear different based on perspective such that distance and angle can be more definitively resolved. Reference tokens can be provided in varying colors, materials, and finishes to ensure they are photogenic in a varying conditions, against varying backdrops, and in frame with various targets. In this regard, reference tokens can be objects which are procured through a manufacturer, or capable of being produced by a user (e.g., printout using consumer printer, displayable on tablet or phone display).

As suggested above, the use of multiple reference elements can be utilized to facilitate faster or more definite assessment of angle and distance. Where multiple reference elements are used, they can be the same or different (e.g., one card, one coin, two cards). Likewise, multiple target elements can be contained in a single frame to permit analysis of multiple targets with minimal user action. Analysis can be performed simultaneously, or multiple targets can be identified and isolated for analysis.

In arrangements where multiple reference elements may be used alone or in combination, various image recognition techniques can be employed to automatically recognize one or more reference elements. In embodiments where image analysis yields limited certainty as to the identity of an object (based on, e.g., discrepancies in pixel-by-pixel comparison, statistical analysis, partial obscuration, noise), a user can be prompted to provide an identity (e.g., identify location of reference element, identify type of reference object such as card or coin, poor image quality, low contrast), confirm a likely identity (e.g., approve recognition as card), or identify boundaries (e.g., identify adjacent corners of sheet of paper partially obscured by target).

Similarly, in embodiments where images of multiple target types may be used (alone or in combination), various image recognition techniques can be employed to automatically recognize the target type. In this way, appropriate measurements can be taken with regard to different target types (e.g., shirts, pants). Where the certainty of the target is limited, users can be prompted to confirm a target identity (e.g., clothing article) or identify the location or shape of the target. Various image manipulation tools such as crop, "magic wand," or "lasso" (e.g., where the user can change thresholds for identifying boundaries or manually trace boundaries) can be used to permit the user to aid in precise identification of the target. It is understood that display of the images, as well as interfaces for prompting users or facilitating other action herein, is implicit in the described techniques.

Figure 2:
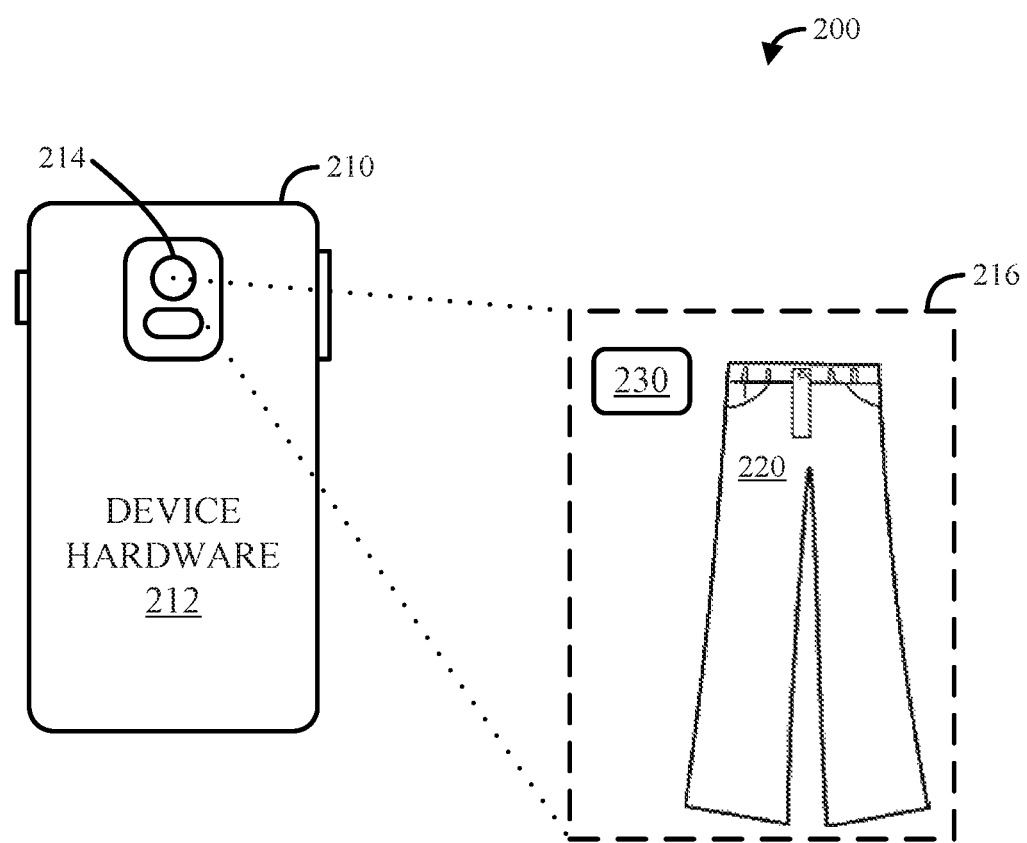
FIG. 2 illustrates a block diagram of a system for establishing measurements of a clothing item using an image capture apparatus.

FIG. 2 illustrates system 200 providing a more specific embodiment of system 100. System 200 includes smart phone 210, smart phone camera 214, and smart phone hardware 212. It is understood that smart phone 210 and its associated subcomponents can take various other forms such as tablets or other computer devices with integral image capture capability.

Smart phone camera 214 can focus on field of view 216, which contains credit card 230 and pants 220. Smart phone camera 214 saves an image of field of view 216, analysis of which is then conducted using smart phone hardware 212. Smart phone hardware 212 can include storage and processing means leveraged to perform at least a portion of analysis algorithms on the image of field of view 216, and/or communication means leveraged to transmit the image of field of view 216 to a remote service which performs at least a portion of analysis algorithms on the image.

Credit card 230 is recognized during analysis and used to establish a two-dimensional coordinate system having an absolute image scale within the image field of view 216. With the image scale established, pants 220 are recognized and various measurements are conducted to fully capture the pants' dimensions in a two dimensional coordinate system with the pants laid flat. In at least one embodiment, six measurements are taken. The measurements can include, but need not be limited to, waist, inseam, outseam, cuff, front rise, back rise, hip, leg opening, and thigh measurements. Based on recognition of pants 220, and pants as a target type generally according with a structure of two legs joined in a waist area, the locations of these measurements can be automatically determined along various lines between parts of the pants. Where pants 220 include tapered or flared aspects, the widest, average, or narrowest measures can be taken alone or stored as separate measures which can be retrieved individually or as a set.

Derivative measurements can also be calculated, to provide greater resolution and clarity as to how measurements will suit various body types. For example, the ratio of thigh to inseam or outseam can indicate the "skinniness" of pants, or how they might fit individuals of particular body shapes.

In addition to recognizing various measurements, other elements of clothing items may be discernible through the machine vision techniques employed. For example, in pants, the size, number, or location of pockets, belt loops, buttons, flies, et cetera can be discovered both for cataloging or comparison to other clothing items. Such functionality may be included in embodiments of the systems and methods herein. In this way, users of smart phone 210 can quickly and easily catalog specific measurements of clothing items.

Figure 3:
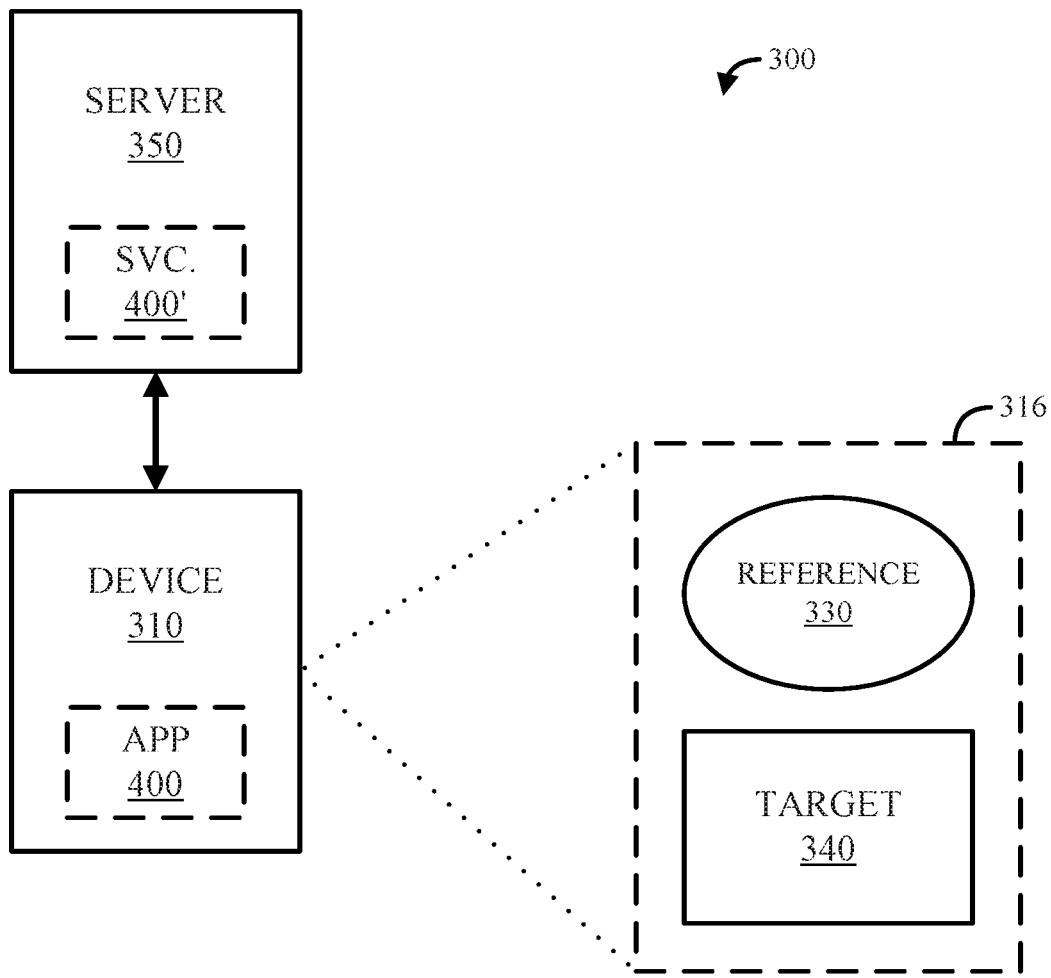
FIG. 3 illustrates a block diagram of a system having a device in communication with a server in which the device causes accurate measuring of target clothing.

FIG. 3 illustrates a system 300 having a device 310 in communication with server 350 in which device 310 causes accurate measuring of target clothing 340. Device 310 can include image capture hardware. Device 310 also includes communication hardware capable of transmitting and receiving data to and from server 350. Device 310 can also contain stored programming or circuitry to effect at least a portion of mobile application 400, described infra. Where one or more portions of mobile application 400 are distributed outside of electronic components of mobile application 400 (e.g., at least a portion of mobile application 400 resident with mobile service 400' on server 350) they can be leveraged or accessed using the communication hardware of device 310 (e.g., through server 350 or other remotely-accessible components). In the latter case, an interface application, browser, or other native capability can be utilized to display information related to the nonresident portions of mobile application 400. In at least one embodiment, mobile application 400 acts as a portal or interface only, and all processing and storage is conducted on server 350.

Device 310 acquires an image of field of view 316 (e.g., using native image capture hardware, from images previously stored in memory, from external storage or image capture via native communication hardware). Field of view 316 includes reference element 330 and target clothing 340. As set forth elsewhere herein, mobile application 400 performs image processing and analysis over at least a portion of field of view 316 to establish an image scale using the known geometry of reference element 330 over at least a two-dimensional plane substantially coincident with the lay of target clothing 340. Either at the start or throughout image processing, reference element 330, target clothing 340, and constituent components thereof can be individually identified automatically or manually. Using the image scale, mobile application 400 resolves various measurements of target clothing 340 based on the image scale.

Server 350, in communication with at least device 310, contains or causes execution of a clothing database and recommendation service in the form of mobile service 400', which is used in combination with, mobile application 400. In embodiments, complementary mobile service 400' can include at least portions of mobile application 400, shown infra. By utilizing server 350, databases can be accumulated to include more than items analyzed by a single user, including products at retailers or otherwise not owned by individuals in a user's immediate network. Various other network and social aspects can be invoked by way of establishing public, semi-private, and private groups of users of mobile application 400 through server 350.

Further, by aggregating user data, statistical analyses can be performed on measurements and user preferences to refine the content of mobile application 400. For example, where multiple users submit measurements of a particular clothing item, or related items (e.g., particular brand or store), the manufacturing precision or consistency can be determined by discovering variances or deviations, and absolute accuracy (e.g., whether a 34" waist is in fact thirty-four inches) regarding items and brands can be made clear. In addition to assisting users finding suitable clothing items as detailed below, this can also assist with consumer education in setting expectations and accurately comparing different items.

While various elements shown in FIGS. 1-3 are shown in different ways in varying diagrams, it is understood that these shapes are merely symbolic, and that reference elements and targets (e.g., clothing) may take any shape or size without departing from the scope and spirit of the innovation.

Figure 4:
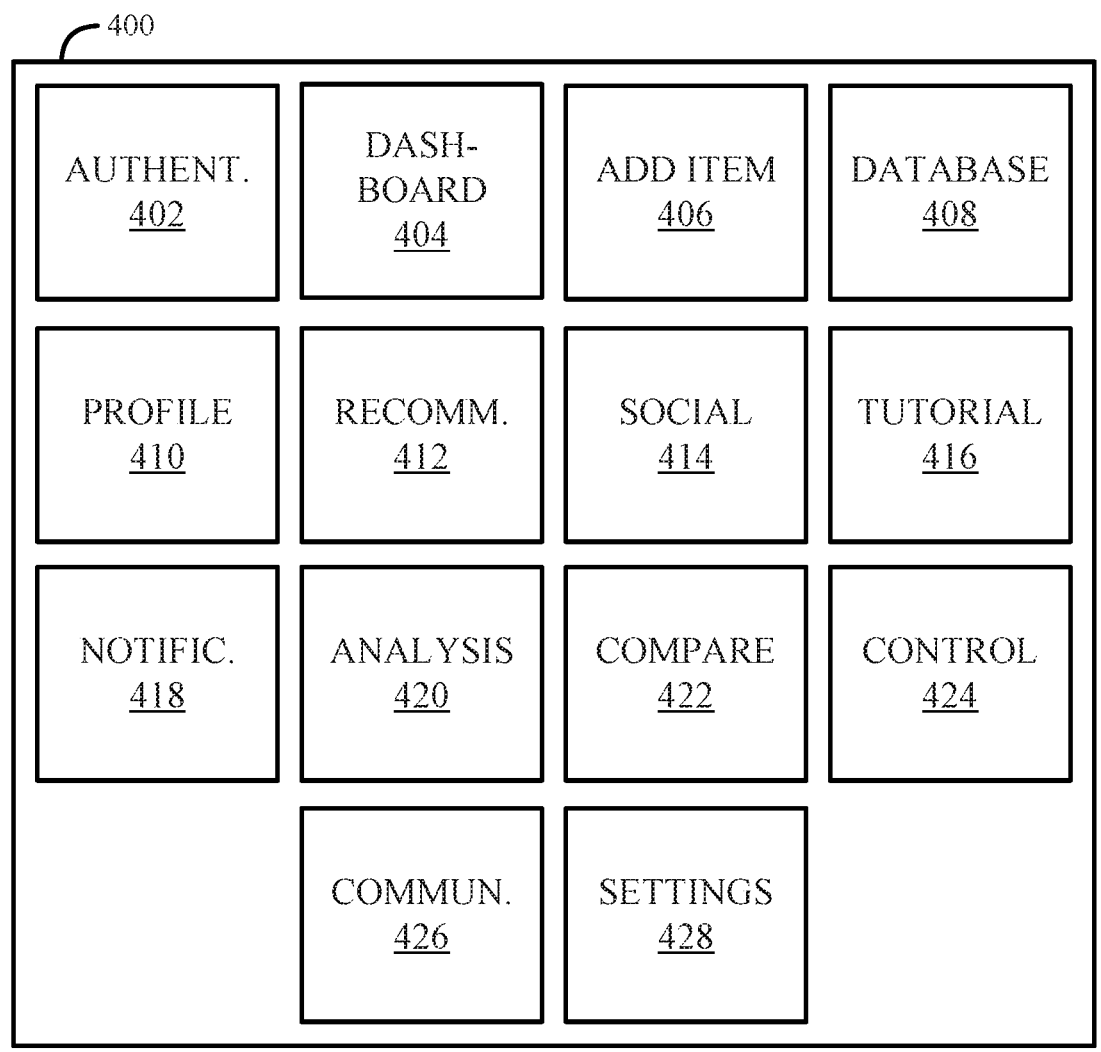
FIG. 4 illustrates a block diagram representing a mobile application and/or mobile service used in conjunction with the system of at least FIG. 3.

Turning to FIG. 4, illustrated is a block diagram representing mobile application 400 and/or mobile service 400' used in conjunction with at least the system of FIG. 3. The block diagram includes a plurality of modules realized through the storage of various routines and data on computer readable media or circuitry, executed by processors or circuitry, the inputs or outputs to and from which can be transmitted as data over various wired or wireless means including but not limited to data networks. As suggested, the modules of 400/400' may be composite to one or both of mobile application 400 and mobile service 400'. In either case, the location of storage or execution is seamless to the user, who receives the same data through an interface or browser regardless.

The modules of mobile application 400 and/or mobile service 400' are now detailed. Authentication module 402 permits authentication of users of mobile application 400 and/or mobile service 400' such that account integrity can be maintained by preventing unauthorized changes. Authentication module 402 manages or provides data permitting a user to provide authenticating credentials (e.g., log-in and password, leveraging of social media account) which can be processed locally or remotely to permit application to data via mobile application 400 or secure against particular changes being made within mobile application 400.

Dashboard module 404 provides the central interface function of mobile application 400 and/or aspects of mobile service 400'. Dashboard module 404 can include data from various other modules, such as database module 408, social module 414, recommendation module 412, et cetera. Dashboard module 404 manages screen real estate and access by defining content and functional areas of screen real estate, and providing menus, links, buttons, et cetera to access or invoke other modules.

Add item module 406 adds a clothing item to database module 408. Database module 408 can be a clothing product database comprising one or more modules which append clothing items stored therein or accessible thereby with additional identifiable, sortable data which can be used to separate a user's own clothing items from those of other users or items available through stores. In a non-limiting example, the additional identifiable and sortable data located within a clothing product database may include information pertaining to the brand or trademark of a specific good, which may be furnished by a third party. Database module 408 can also include a reference object database which stores identifying information and measurements for one or more reference objects which can be used in conjunction with analysis module 420 to establish scale. Further, the Database module 408 may include a third party's brand database as part of an additional module. Add item module 406 includes dialogs and interfaces to add a clothing item (or other items such as a reference object) from a captured image, and leverages at least analysis module 420 and/or compare module 422 to accumulate the measurements and comparative information pertinent to the clothing item (e.g., providing true measurements of a user's clothing and comparing the true measurements to other clothing items in database module 408 but not owned by the user).

Profile module 410 manages a user profile associated with an account associated with at least the clothing preferences (e.g., styles, brands) and social aspects (e.g., what clothing or activity is shared, user profile presented to network). Settings module 428 manages the administrative side of user accounts, such as passwords, permissions, allowed devices, interface arrangement (e.g., colors or layout provided by dashboard module 404), contact information, et cetera.

Recommendation module 412, as suggested above, recommends clothing based on the user's "closet" provided to database module 408 using at least add item module 406. Recommendations can be based on matched or similar actual dimensions as measured using techniques employing reference elements to define image scales as discussed herein. For example, clothing with the most closely matched dimensions to an article of clothing of which the user likes the fit can be recommended. In an embodiment, shirts can be measured according to front length (e.g., from front tails to armpit), pull length (e.g., shoulder to rear tail), shoulder width, sleeve length, chest width, hip width, and neck size. Various fit characteristics can be determined based on derivative measures, such as the ratios of shoulder width to hip width or length to chest width. Recommendation module 412 can find other clothing items with measurements similar to those of an item selected by the user (e.g., indicating the user likes the fit). For example, one or both of the user's clothing item and the clothing item being compared can be shown along with the measurements collected at least through the image processing techniques described.

The measurements can be indicated to be a "match" (e.g., perfect match, within 5%), "similar" (e.g., within 10%, within 20%), or a mismatch (e.g., not within 20%). In alternative or complementary embodiments, other characteristics (e.g., colors, patterns, pocket configuration) can be evaluated independently or in conjunction with measurements to recommend similar clothing items. The user may individually indicate thresholds for clothing indicated to be matched, similar, or mismatched, or may define particular weights for particular matched factors (e.g., rise of pant more important than thigh width). Where a match is not perfect, alternative or supplemental information can indicate whether the similar or mismatched measurement is smaller or larger.

Compare module 422, described below, provides further details as to similarity ranking and selecting items for suggestion as matched, similar, larger, smaller, et cetera.

Recommendation module 412 or associated interfaces may also utilize filters when providing recommendations. In embodiments, a user may indicate particular sources from which to draw recommendations (e.g., brands, stores, price constraints, owned by an influential social participant) to limit the results returned in comparisons. In alternative or complementary embodiments, categories of clothing can be navigated. For example, a user can select to view recommendations from mainstream and/or designer clothing. In another example, a user can limit recommendations during a session to specific types of clothing. Various types or style trees can be generated, such that a user specifies pants, or more specifically jean pants, or more specifically boot cut jean pants, in contrast with skinny chino pants. In still another example, categories of clothing can be organized by function or formality, such as casual, business, and formal. Such example categories and others are not exclusive, and various filters or constraints can be used in combination to limit the users' recommendations (e.g., during a session or until changed) to specifically the type of clothing sought. However, it is understood that users may also participate with no filters, and receive recommendations related to all types of clothing they provide or "like."

Recommendation module 412 contributes to a live feed which displays the recommendations when the feed is selected. Recommendation module 412 can also provide recommendations (e.g., pictures, information, and links related to a recommended clothing item) through other modules or interfaces (e.g., specific user request for recommendation).

For example, selecting a recommended item (e.g., tapping on screen) can provide zoomed, zoomable, or alternate views of the garment, additional interface aspects (e.g., "like," "dislike," "add to wish list"), or further details (e.g., brand, item, size, measurements, details, purchase location, comparison against other item). Where purchase options are sought, multiple options can be presented to the user (e.g., go to brand's site, find a retailer). In embodiment, mobile service 400' can include recommendations to partner sites carrying various recommended items. Items selected after recommendation by recommendation module 412 (or other means) may also be shared through e-mail, text, linked social media accounts, on the live feed of mobile application 400/mobile service 400'.

Recommendation module 412 is not confined to the individual users' recommendations, but can also provide recommendations related to others with whom an individual user is connected. For example, as described below, a user may view recommendations for their friends, based on their friends' "closet" of clothing and preferences, in a manner similar to which they view their own recommendations.

Social module 414 provides functionality to allow users to share clothing owned (and measurements, reviews, or other information related thereto), preferences, purchases, wish lists, and personal information. In addition to sharing users' clothing ownership and "likes"/"dislikes," social module 414 tracks profile information of connected users, and can generate notifications. For example, a friend's birthday can be published in an interface associated with social module 414, and/or pushed through notification module 418, providing a user a link to the friend's profile and/or wish list. This not only assists with remembering the friend's birthday, but enables quick purchasing of a present based on the friend's specific wants or recommendations based on their wardrobe and preferences.

Social module 414 permits connecting and "following" of various other users. Users may explicitly connect through mutual agreement, thereby sharing more content with one another than is shared with the general public, or unilateral following may occur such as when a user wishes to receive information about a celebrity, brand, store, or other entity.

Social module 414 also contributes to the live feed, which updates automatically with recommendations based on other users or network activity. In embodiments, the user can toggle between recommendation-only feed, social feed, and combined feed.

In both social and recommendation feeds, users can "like" or "unlike" items, add items to their "closet" or "wardrobe" (e.g., user's owned clothing in or accessed by database module 408), and add items to a wish list. In this way, recommendations can be further refined by identifying brands, styles, or fits that users wish to see more or less of based on current ownership and likes or dislikes. This content may also be published to other users through social aspects of the live feed.

Notification module 418 provides notifications or alerts to users of mobile application 400 and/or subscribers of mobile service 400'. Notifications may be "push" messages whereby information is provided to a user without the user's immediately preceding request. While notifications will typically be provided through an interface on a user device (e.g., dashboard module 404, interfaces associated with other modules), it is understood that notifications may also be provided through other interfaces (e.g., leveraging device's operating system) or linked accounts (e.g., e-mail, text message, social media account). Various notifications related to the live feed, messages, product availability, new products, recommendations, other users or businesses, and the system itself can be provided.

Tutorial module 416 functions to provide users guided instruction for use of mobile application 400 in conjunction (and/or mobile service 400'). Tutorial module 416 can invoke various other modules to perform an action using mobile application 400 and/or mobile service 400', or can provide emulation or recorded displays of use of the same. In this fashion, users may be shown the operation of mobile application 400 (and/or mobile service 400') to increase familiarity or proficiency.

Analysis module 420 provides image analysis capabilities as described herein. When provided one or more images, analysis module 420 may, automatically or with assistance from a user, identify a reference object and clothing items, create an image scale for the one or more images, and then solve measurements pertinent to the clothing items. Analysis module 420 provides the measurements, images, and other related information to database module 408 for storage and further access.

Compare module 422 compares data generated by analysis module 420 for different clothing items. The comparisons produce comparative data which includes the differences in respective measurements between two clothing items in or accessible by database module 408 (e.g., owned sleeve to compared sleeve, Levis® hem to Lucky® hem). The comparison data is used at least to automatically generate recommendations based on similarities as well as display the differences in products to users.

Compare module 422 can rank ranked items according to most similar and least similar in a category or subset of compared items. Items most similar can be based on comparisons between one or more measurements. Measurements can be treated of equal weight (e.g., hem is the same as waist) or weighted (e.g., sleeve length more important than waist width). Thus, weighted or un-weighted, a total difference can be calculated, or other methods utilized, to determine the smallest total difference in a most similar item, and the largest total difference in a least similar item. Similarity can also be based on calculated values dependent on various measurements, such as a geometric mean or arithmetic mean. A geometric mean can be calculated based on the square roots of summed squared differences in clothing measurements, while an arithmetic mean can be the average difference of all different measurements.

In an embodiment, compare module 422 employs an algorithm for a best match or most similar item by limiting a group of clothing items for comparison to those with one or more measurements within one or more measurement tolerances. Tolerances for different measurements can be different in embodiments (e.g., inseam and outseam both within one half inch, sleeve within three quarters of one inch and neck both within one half inch). Comparisons may then be made, and items with the least difference can be identified as most similar. Less similar items may also be recommended where no items match all measurements by selecting the most measurements within the tolerance or specific critical measurements (e.g., waist, inseam) which must be matched or within their respective tolerance before considering other factors. In an embodiment, a specific number of measurements (e.g., 4 of 6) must be matched to include a garment as similar.

Control module 424 is utilized to generate and/or route control signals to hardware or software components outside mobile application 400/mobile service 400' to leverage such components for use by mobile application 400/mobile service 400'. For example, rather than load a stored picture taken with an onboard camera after it is stored by the native camera application(s), control module 424 can leverage the onboard camera of the user device to directly take pictures which are immediately and automatically provisioned to analysis module 420. Control module 424 can also manage device settings or activity as necessary to support aspects herein (e.g., process priority, power management, screen brightness, timeout periods).

Communication module 426 manages communication related to mobile application 400/mobile service 400', and may perform functions such as conducting handshakes, formatting data, transmitting and receiving data, et cetera. In embodiments, communication module 426, alone or in combination with control module 424, utilizes a wireless radio transceiver to send and receive network signals. Such signals can be transmitted to and from private networks, such as one accessed or established by mobile service 400', or over open networks such as the Internet (e.g., to access content or web sites of brands or stores carrying recommended clothing items).

The following example is provided to describe the unified function of such modules. A user loading mobile application 400 can be presented with a splash screen to introduce the product, which thereafter proceeds to one of tutorial module 416 or authentication module 402. Alternatively, tutorial module can be accessible or invoked after login. Using authentication module 402, the user can log in. If the user is a new user, authentication module 402 can present options to create an account. Password recovery and other authentication assistance aspects can be provided with authentication module 402.

After authenticating, dashboard module 404 is presented to the user. Dashboard module 404 can provide access to add item module 406 (e.g., button or menu selection to "add item"), database module 408 (e.g., "my closet" button or menu selection), recommendation module 412 (e.g., "discover" button or menu selection), social module 414 (e.g., "friends" button or menu selection), notification module 418 (e.g., notifications button or menu selection), profile module 410 (e.g., profile button or menu selection), settings module 428 (e.g., settings button or menu selection), and so forth.

Selection of add item 406 module triggers various options through the interface, such as to add an item from an existing image gallery (which then permits the user to select from the gallery) or from a camera (which then permits the user to take a picture). Once the image is loaded, the user can edit item details (e.g., name, freeform type of clothing, type of clothing selected from a list, brand, favorite marking) and save the image with the details.

Selection of database module 408, and particularly the user's items therein, triggers options including view all items, view favorite items, and view wish list. Selection of all items or favorites can provide a view of details (e.g., photo, measurements, tag size, favorite status) and the ability to edit some details (e.g., select new photo from gallery, select new photo from camera, mark favorite, delete). Selection can also enable sharing (e.g., over feed, over linked social network, over e-mail), and searching for similar items.

Selection of the wish list can provide similar interfaces or dialogues, permitting users to view details, share, and add or delete items. Wish list items can also include links to sites or retailers related to or dealing in the particular wish list item.

Selecting recommendation module 412 can open additional or similar options for a user. A feed can be presented providing continuous recommendations based on a variety of inputs. For example, measurements of added clothing items, measurements of the user's body, the user's wish list, favorites, followed brands, followed people, liked items, and feature products (e.g., analytics-based advertisements) can be presented in the feed. The feed can permit users to select items for detail view, like or dislike items, add items to wish list, find similar items, compare items to owned clothing, and go to item or retail sites. Feed results can also be filtered using various word searches, category or constraint filters (e.g., brands, clothing types, price points). The feed can also be refreshed at any time in addition to any continuous or periodic updates.

Selection of social module 414 can present a social activity portion of a feed and a friends list. The social activity feed shows friend activity including items added to wish lists, items liked, items added to favorites, and may include the same activity for the user to show the content they publish to the social activity portion of the feed. Content shown in the feed can include options to like, add to wish list, add to favorites, and engage in other interaction described herein. Selection of the friends list allows user to show all contacts or filter by friends, family, followed brands or celebrities, et cetera. Pending friend requests can be answered, and add/follow dialogs can permit users to search for friends, import friends from social networks, and invite friends. Recommendations for whom to follow, such as trend setters or brands, can be provided. The friend list can be managed by included delete or ignore capabilities. The user can also view their publicly or semi-privately shared info, such as name, photo, birthday, location, sizes, wish list, and favorites. Finally, gift sending can be enabled through social module 414 by allowing users to locate friends' wish list items and then provide points of sale (e.g., retail brick and mortar store nearby, online store) where the gift can be purchased. A registry system can be enabled to prevent multiple friends from purchasing the same gift.

Selecting notification module 418 shows users' notifications such as requested friend connections, sent friend connection requests which have been accepted, new contacts joining the system, new likes to the users' items, the purchase of gifts, et cetera.

Selecting profile module 410 allows the user to view and edit their profile information such as photo, name, username, birthday, gender, location, items count, sizes, body measurements, public favorites, public wish list, friends, and entities following or followed.

Selecting settings module 428 permits the user to access various settings, such as general settings related to the application (e.g., metric or US customary units of measure), notification settings (e.g., types of notifications and method of notification), linked accounts (e.g., connect account with Twitter®), privacy settings (e.g., content to show or hide), and log out.

Various help dialogs, info buttons, or interfaces providing "tips" can be integrated into one or more of the modules or interfaces associated therewith. These can provide the user guidance, invoking tutorial module 416 or separate content, to ensure the user understands and best utilizes mobile application 400/mobile service 400'.

While these aspects have been described with respect to modules and respective interactions and functionality, other possible arrangements of modules, and particularly additional cross-linking and combined action, will be apparent on study of the disclosures herein.

Figure 5:
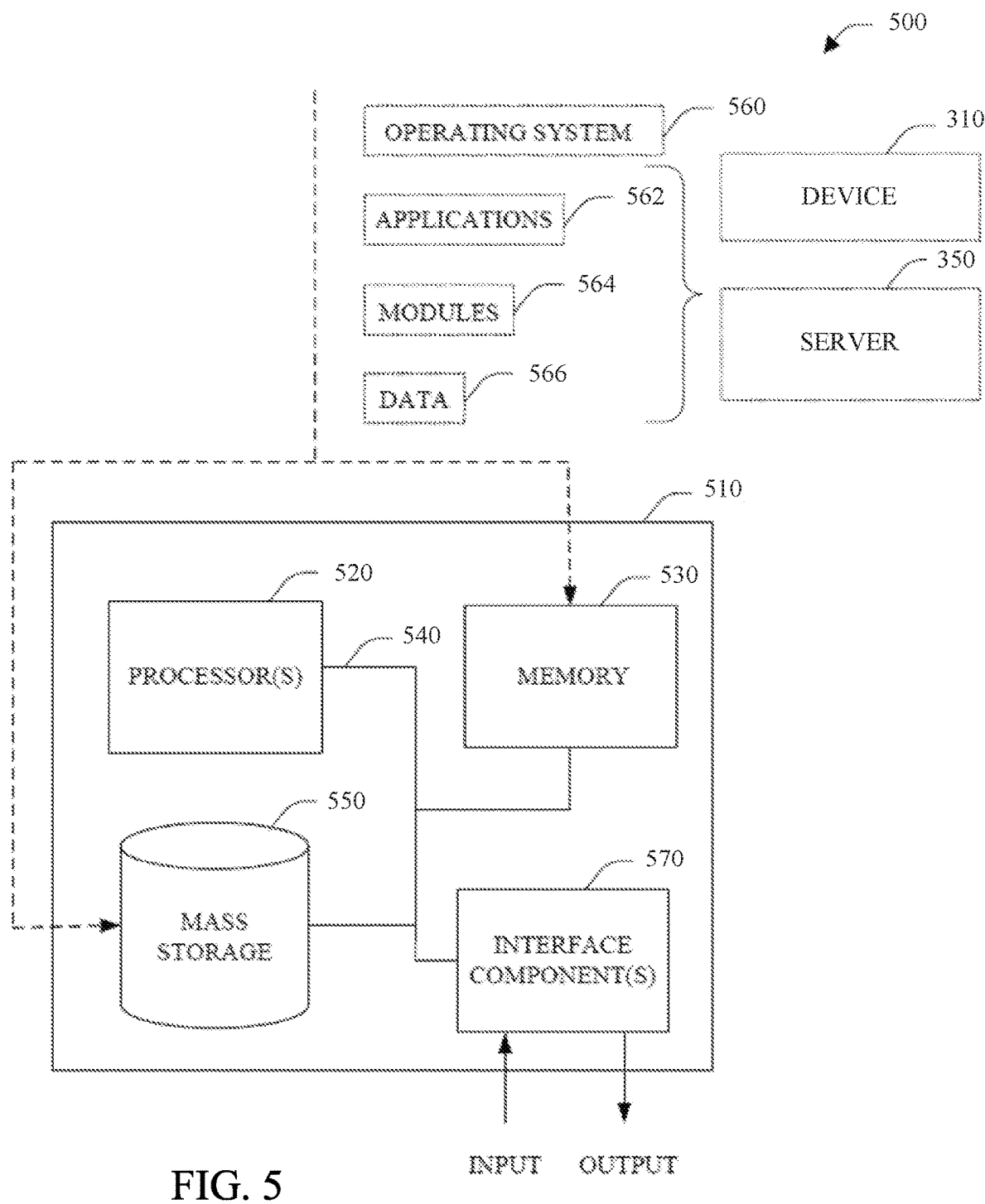
FIG. 5 illustrates a block diagram of an example general-purpose computer or computing device.

In order to provide a context for the claimed subject matter, FIG. 5 as well as the following discussion are intended to provide a brief, general description of a suitable environment in which various aspects of the subject matter can be implemented. The suitable environment, however, is only an example and is not intended to suggest any limitation as to scope of use or functionality.

While the above disclosed systems and methods can be described in the general context of computer-executable instructions of a program that runs on one or more computers or network hardware, those skilled in the art will recognize that aspects can also be implemented in combination with various alternative hardware, software, modules, et cetera. As suggested earlier, program modules include routines, programs, components, data structures, among other things that perform particular tasks and/or implement particular abstract data types. Moreover, those skilled in the art will appreciate that the above systems and methods can be practiced with various computer system configurations, including single-processor, multi-processor or multi-core processor computer systems, mini-computing devices, mainframe computers, as well as personal computers, handheld computing devices (e.g., personal digital assistant, portable gaming device, smartphone, tablet, Wi-Fi device, laptop, phone, among others), microprocessor-based or programmable consumer or industrial electronics, and the like. Aspects can also be practiced in distributed computing environments where tasks are performed by remote processing devices that are linked through a communications network. However, some, if not all aspects of the claimed subject matter can be practiced on stand-alone computers. In a distributed computing environment, program modules may be located in one or both of local and remote memory storage devices.

With reference to FIG. 5, illustrated is an example general-purpose computer 510 or computing device (e.g., desktop, laptop, server, hand-held, programmable consumer or industrial electronics, set-top box, game system, et cetera). The computer 510 includes one or more processor(s) 520, memory 530, system bus 540, mass storage 550, and one or more interface components 570. The system bus 540 communicatively couples at least the above system components. However, it is to be appreciated that in its simplest form the computer 510 can include one or more processors 520 coupled to memory 530 that execute various computer executable actions, instructions, and or components stored in memory 530.

The processor(s) 520 can be implemented with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. The processor(s) 520 may also be implemented as a combination of computing devices, for example a combination of a DSP and a microprocessor, a plurality of microprocessors, multi-core processors, one or more microprocessors in conjunction with a DSP core, or any other such configuration.

The computer 510 can include or otherwise interact with a variety of computer-readable media to facilitate control of the computer 510 to implement one or more aspects of the claimed subject matter. The computer-readable media can be any available media that can be accessed by the computer 510 and includes volatile and nonvolatile media, and removable and non-removable media. By way of example, and not limitation, computer-readable media may comprise computer storage media and communication media.

Computer storage media includes volatile and nonvolatile, removable and non-removable media implemented in any method or technology for storage of information such as computer-readable instructions, data structures, program modules, or other data. Computer storage media includes, but is not limited to memory devices (e.g., random access memory, read-only memory, electrically erasable programmable read-only memory, et cetera), magnetic storage devices (e.g., hard disk, floppy disk, cassettes, tape, et cetera), optical disks (e.g., compact disk, digital versatile disk, et cetera), and solid state devices (e.g., solid state drive, flash memory drive such as a card, stick, or key drive, et cetera), or any other medium which can be used to store the desired information and which can be accessed by the computer 510.

Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Also, a connection can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above can also be included within the scope of computer-readable media.

Memory 530 and mass storage 550 are examples of computer-readable storage media. Depending on the exact configuration and type of computing device, memory 530 may be volatile (e.g., RAM), non-volatile (e.g., ROM, flash memory, et cetera) or some combination of the two. By way of example, the basic input/output system (BIOS), including basic routines to transfer information between elements within the computer 510, such as during start-up, can be stored in nonvolatile memory, while volatile memory can act as external cache memory to facilitate processing by the processor(s) 520, among other things.

Mass storage 550 includes removable/non-removable, volatile/non-volatile computer storage media for storage of large amounts of data relative to the memory 1030. For example, mass storage 550 includes, but is not limited to, one or more devices such as a magnetic or optical disk drive, floppy disk drive, flash memory, solid-state drive, or memory stick.

Memory 530 and mass storage 550 can include, or have stored therein, operating system 560, one or more applications 562, one or more program modules 564, and data 566. The operating system 560 acts to control and allocate resources of the computer 510. Applications 562 include one or both of system and application software and can exploit management of resources by the operating system 560 through program modules 564 and data 566 stored in memory 530 and/or mass storage 550 to perform one or more actions. Accordingly, applications 562 can turn a general-purpose computer 510 into a specialized machine in accordance with the logic provided thereby.

All or portions of the claimed subject matter can be implemented using standard programming and/or engineering techniques to produce software, firmware, hardware, or any combination thereof to control a computer to realize the disclosed functionality. By way of example and not limitation, services run on server 350 (or portions thereof) and/or communications/processing/storage performed on device 310 (or portions thereof) can be, or form part, of an application 562, and include one or more modules 564 and data 566 stored in memory and/or mass storage 550 whose functionality can be realized when executed by one or more processor(s) 520.

In accordance with one particular embodiment, the processor(s) 520 can correspond to a system on a chip (SOC) or like architecture including, or in other words integrating, both hardware and software on a single integrated circuit substrate. Here, the processor(s) 520 can include one or more processors as well as memory at least similar to processor(s) 520 and memory 530, among other things. Conventional processors include a minimal amount of hardware and software and rely extensively on external hardware and software. By contrast, an SOC implementation of processor is more powerful, as it embeds hardware and software therein that enable particular functionality with minimal or no reliance on external hardware and software. For example, the mobile application 400 (and/or associated functionality)

and/or mobile service 400' (and/or associated functionality) can be embedded within hardware in a SOC architecture.

The computer 510 also includes one or more interface components 570 that are communicatively coupled to the system bus 540 and facilitate interaction with the computer 510. By way of example, the interface component 570 can be a port (e.g., serial, parallel, PCMCIA, USB, FireWire, et cetera) or an interface card (e.g., sound, video, et cetera) or the like. In one example implementation, the interface component 570 can be embodied as a user input/output interface to enable a user to enter commands and information into the computer 510 through one or more input devices (e.g., pointing device such as a mouse, trackball, stylus, touch pad, keyboard, microphone, joystick, game pad, satellite dish, scanner, camera, other computer, et cetera). In another example implementation, the interface component 570 can be embodied as an output peripheral interface to supply output to displays (e.g., CRT, LCD, plasma, et cetera), speakers, printers, and/or other computers, among other things. Still further yet, the interface component 570 can be embodied as a network interface to enable communication with other computing devices, such as over a wired or wireless communications link.

In view of the example devices and elements described herein, or independent thereof, methodologies that may be implemented in accordance with the disclosed subject matter will be better appreciated with reference to the flow charts. While for purposes of simplicity of explanation, the methodologies are shown and described as a series of block steps, the claimed subject matter is not limited by the order of the block steps, as some block steps may occur in different orders and/or concurrently with other block steps from what is depicted and described herein. Moreover, not all illustrated block steps may be required to implement the methods described herein, or other steps or aspects finding support elsewhere in the specification may be invoked without being expressly illustrated.

Figure 6:
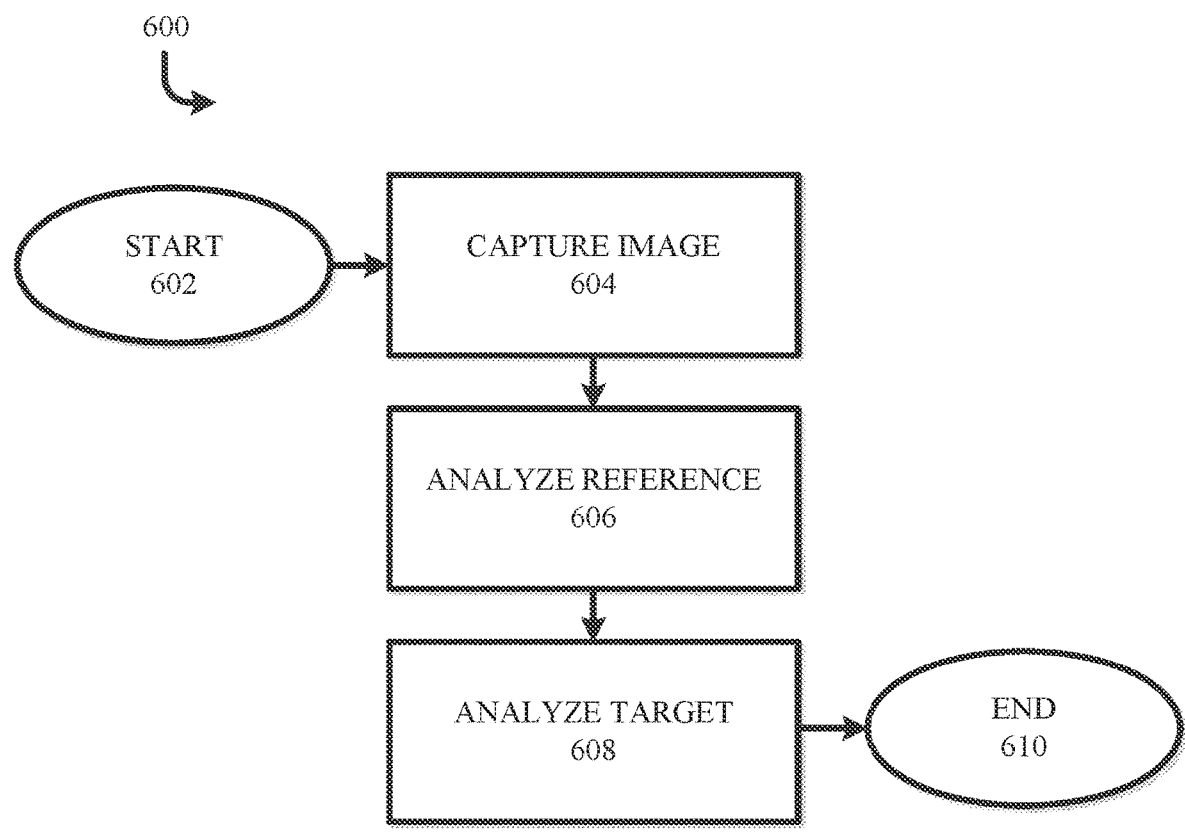
FIG. 6 illustrates a flow chart of an example methodology 600 for analyzing a target image.

FIG. 6 illustrates a flow chart of an example methodology 600 for analyzing a target image. Methodology 600 begins at 602 and proceeds to 604 where an image containing a reference object and a target object is captured. At 606, the reference object is analyzed through image processing and used to establish an image scale. Thereafter, using the image scale, the target is analyzed at 608. Analysis of the target includes generating a plurality of measurements representing the target at least two-dimensionally. When target analysis is complete, methodology 600 proceeds to end at 610. As described herein, the target item can be a clothing item, such as a pair of pants, a shirt, a coat, a pair of shorts, a skirt, a dress, et cetera.

Figure 7:
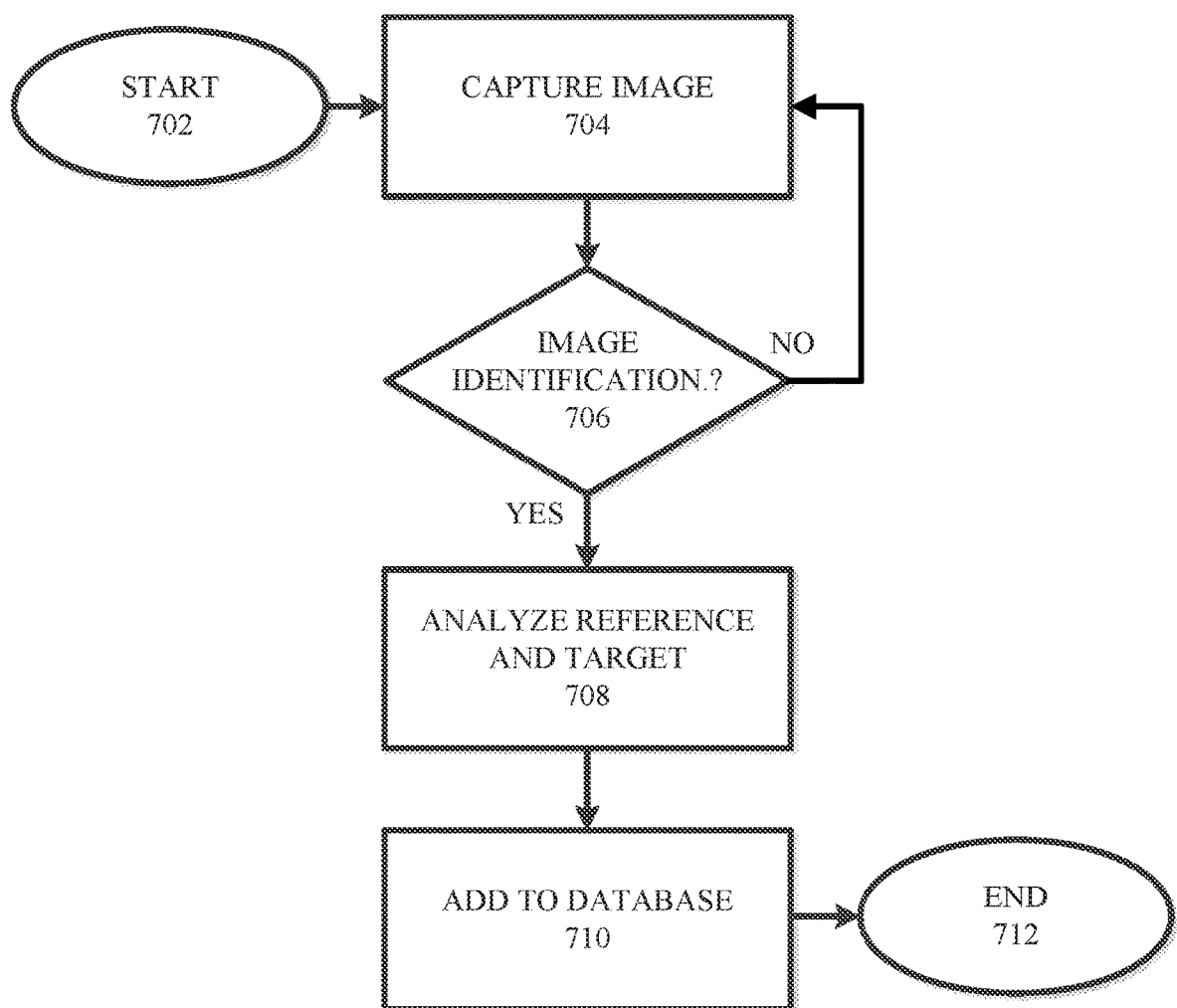
FIG. 7 illustrates a flow chart of an example methodology 700 for adding a clothing item to a database.

FIG. 7 illustrates a flow chart of an example methodology 700 for adding a clothing item to a database. Methodology 700 begins at 702 and proceeds to capture the image at 704. At 706, a determination is made as to whether the image can be properly identified. For example, a determination can be made as to whether the image quality is sufficient, whether edges or blobs can be detected, whether the angle is appropriate (e.g., based on the image itself, based on an electronic level within the device taking the picture), whether aspects of the image are symmetrical or appropriate for perspective, et cetera. At 708, the reference and target are analyzed to develop measurements of the target clothing as described herein. Once the measurements are calculated, the image (or a derivative thereof), the measurements, and other data is added to the database at 710. The database can be a database related to a single user, or a collective database for two or more users or entities. After the item is added to the database, methodology 700 ends at 712.

Figure 8:
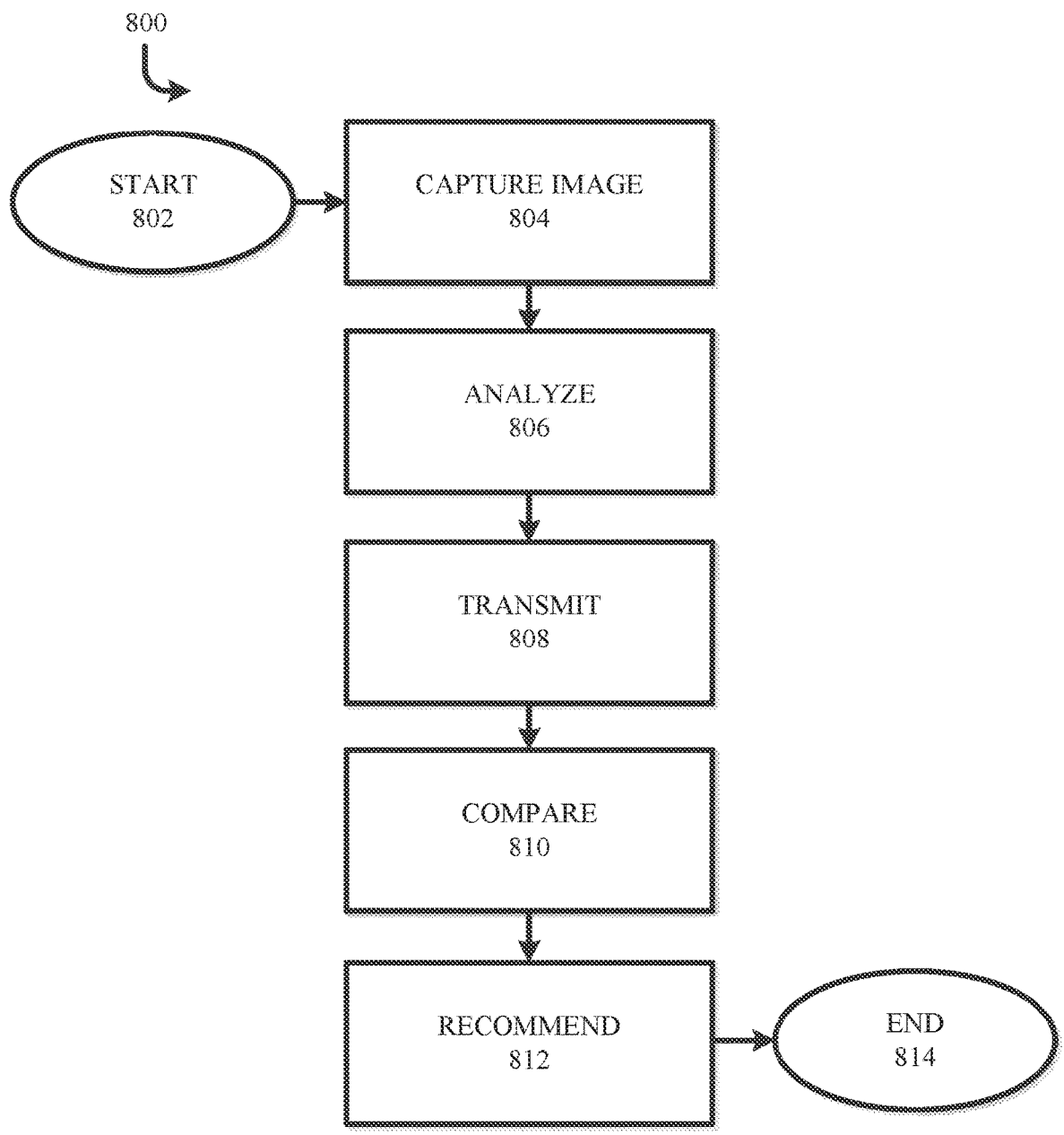
FIG. 8 illustrates a flow chart of an example methodology 800 for providing recommendations to a user related to a clothing item.

FIG. 8 illustrates a flow chart of an example methodology 800 for providing recommendations to a user related to a clothing item. Methodology 800 begins at 802 and proceeds to 804 where an image including a reference object and the clothing item is captured. At 806, analysis of the reference object and clothing item is performed to establish measurements of the clothing item. At 808, at least the measurements, and in embodiments the image and additional information, is transmitted to a service which consolidates clothing item information. At 810, a comparison is made between the measurements calculated at 806 and the measurements of other clothing items stored or consolidated using the service. Based on these comparisons, recommendations are returned to the user at 812. Following the recommendations, methodology 800 can end at 814.

While the methodologies of FIGS. 6-8 depict various example methods, these methods are illustrated to suggest the scope and spirit of, rather than exhaustively detail, methodologies herein. On review of the disclosure, it is understood that other aspects or variants, described by portions of the text and drawings not directed to methods, are equally embraced when explained or enacted through methodology, and other steps or aspects can be utilized in conjunction with methods herein without exceeding the understood bounds of the invention.

In the specification and claims, reference will be made to a number of terms that have the following meanings. The singular forms "a", "an" and "the" include plural referents unless the context clearly dictates otherwise. Approximating language, as used herein throughout the specification and claims, may be applied to modify a quantitative representation that could permissibly vary without resulting in a change in the basic function to which it is related. Accordingly, a value modified by a term such as "about" is not to be limited to the precise value specified. In some instances, the approximating language may correspond to the precision of an instrument for measuring the value. Moreover, unless specifically stated otherwise, a use of the terms "first," "second," etc., do not denote an order or importance, but rather the terms "first," "second," etc., are used to distinguish one element from another.

As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances the modified term may sometimes not be appropriate, capable, or suitable. For example, in some circumstances an event or capacity can be expected, while in other circumstances the event or capacity cannot occur—this distinction is captured by the terms "may" and "may be."

As utilized herein, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Illustrative embodiments are described herein to illustrate the spirit of the invention rather than detail an exhaustive listing of every possible variant. It will be apparent to those skilled in the art that the above devices and methods may incorporate changes and modifications without departing from the general scope of the claimed subject matter. It is intended to include all such modifications and alterations within the scope of the claimed subject matter. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method of determining a plurality of measurements of a laid-flat clothing article having a clothing type, the method comprising:
    capturing at least one digital image of a laid flat clothing article;
    analyzing the clothing article in the digital image to determine the clothing type and to recognize a plurality of type-specific measurement points of the clothing article based on the geometry and boundaries of the image of the clothing article;
    identifying a pair of type-specific measurement points from the plurality of type-specific measurement points in the digital image for each of the plurality of measurements;
    determining a distance between each pair of measurement points in the digital image;
    applying a scale of the digital image to the determined distance between each pair of measurement points to determine the value for each of the plurality of measurements; and
    storing the plurality of measurements in a database.

2. The method of claim 1, wherein the method steps are performed on a portable electronic device.

3. The method of claim 1, wherein the step of capturing at least one digital image is performed on a mobile electronic device and the step of analyzing the clothing article is performed by a remote service associated with an application on the mobile device.

4. The method of claim 1, wherein the step of capturing at least one digital image is performed on an electronic device including an image capture device, and the electronic device transmits the digital image to remote computing resources to perform the remaining steps of claim 1.

5. The method of claim 1 further comprising:
    analyzing the digital image to determine a perspective distortion based upon analysis of a reference object, and
    automatically compensating for the perspective distortion when determining the value for each of the plurality of measurements of the clothing article.

6. The method of claim 1, wherein the least one digital image a reference object, the method further comprising the step of analyzing the reference object in the digital image to determine the scale of the digital image.

7. The method of claim 6 wherein the reference object is a common object which resists deformation.

8. The method of claim 6 further comprising:
    analyzing the digital image to identify the reference object in the digital image; and
    automatically retrieving the predefined dimensions of the reference object based upon an identification of the reference object.

9. The method of claim 1, wherein the step of capturing at least one digital image of a laid flat clothing article comprises capturing a plurality of digital images of the clothing article.

10. The method of claim 9, wherein the plurality of digital images comprise a plurality of views of the clothing article.

11. The method of claim 1, wherein determining the distance between each pair of measurement points in the digital image includes:
    determining a linear distance between each pair of measurement points based upon pixel coordinates of each measurement point in the digital image; and
    scaling the linear distance scaling according to the image scale.

12. The method of claim 1, further comprising the steps of:
    automatically accessing a clothing product database, wherein the clothing product database includes defined measurement values for each of a plurality of clothing products; and
    automatically identifying a recommended clothing product based upon a comparison of the determined values and the defined measurement values for each of a plurality of clothing products.

13. The method of claim 1, wherein the determined value for each of the plurality of type-specific measurements are transmitted to a server of a clothing recommendation system.

14. The method of claim 13 further comprising:
    transmitting the determined value for each of the plurality of type-specific measurements to a server of a clothing recommendation system; and
    storing the determined value for each of the plurality of type-specific measurements on the server of the clothing recommendation system.

15. The method of claim 13 further comprising:
    transmitting the captured digital image with the determined value for each of the plurality of type-specific measurements to the server of the clothing recommendation system, and
    storing the captured digital image with the determined value for each of the plurality of type-specific measurements on the server.

16. The method of claim 13 further comprising:
    storing the determined value for each of the plurality of type-specific measurements for each of a plurality clothing articles on the server of the clothing recommendation system to provide a respective plurality of determined values, wherein each of the plurality of clothing articles have the same clothing type,
    automatically determining an average value from the respective plurality of determined values for each of the plurality of type-specific measurements, and
    storing the determined average values as the determined values for each of the plurality of type-specific measurements for the clothing type of the plurality of clothing articles.

17. A clothing measurement system configured to measure a clothing article having a clothing type comprising:
    a capture device, comprising a housing and a processor, a memory, a display and a camera associated with the housing;
    a remote image analysis service;

an application resident in the memory of the capture device and configured to be executed by the processor of the capture device to cause the processor to:
capture a digital image of a laid flat clothing article with the camera of the portable electronic device; and
transmit the digital image to the remote image analysis service;
the remote image analysis service being configured to:
analyze the clothing article in the digital image to determine the clothing type and to recognize a plurality of type-specific measurement points of the clothing article based on the geometry and boundaries of the image of the clothing article;
identify a pair of type-specific measurement points from the plurality of type-specific measurement points in the digital image for each of the plurality of measurements;
determine a distance between each pair of measurement points in the digital image;
apply a scale of the digital image to the determined distance between each pair of measurement points to determine the value for each of the plurality of measurements; and
store the plurality of measurements in a database.

18. The clothing measurement system of claim 17, wherein the remote image analysis service is further configured to:
automatically access a clothing product database, wherein the clothing product database includes defined measurement values for each of a plurality of clothing products; and
automatically identify a recommended clothing product based upon a comparison of the determined values and the defined measurement values for each of a plurality of clothing products.

* * * * *

UNITED STATES PATENT AND TRADEMARK OFFICE
CERTIFICATE OF CORRECTION

PATENT NO. : 11,200,610 B2  
APPLICATION NO. : 16/415811  
DATED : December 14, 2021  
INVENTOR(S) : Dave J. Desmarais and Kristy L. Desmarais Page 1 of 1

It is certified that error appears in the above-identified patent and that said Letters Patent is hereby corrected as shown below:

In the Specification

Column 1, Line 32, delete "e-commerce based" and insert thereto --e-commerce-based--.
Column 3, Line 24, delete "dimensions" and insert thereto --dimension--.
Column 3, Line 56, delete "pant" and insert thereto --pants--.
Column 4, Line 12, delete "electronics," and insert thereto --electronics--.
Column 5, Line 62, delete "three dimensional" and insert thereto --three-dimensional--.
Column 5, Line 66, delete "three dimensional" and insert thereto --three-dimensional--.
Column 6, Line 14, delete "a".
Column 7, Line 13, delete "two dimensional" and insert thereto --two-dimensional--.
Column 17, Line 65, delete "is" and insert thereto --are--.
Column 19, Line 59, delete "least" and insert thereto --at least--.
Column 19, Line 60, delete "a" and insert thereto --is a--.
Column 20, Line 50, delete "plurality" and insert thereto --plurality of--.

Signed and Sealed this  
First Day of March, 2022

Drew Hirshfeld  
*Performing the Functions and Duties of the*  
*Under Secretary of Commerce for Intellectual Property and*  
*Director of the United States Patent and Trademark Office*